US012137780B2

(12) United States Patent
Maguire

(10) Patent No.: US 12,137,780 B2
(45) Date of Patent: Nov. 12, 2024

(54) CASES WITH MULTIPOLE MAGNET HINGES

(71) Applicant: Bose Corporation, Framingham, MA (US)

(72) Inventor: Stephen J. Maguire, Grafton, MA (US)

(73) Assignee: Bose Corporation, Framingham, MA (US)

( * ) Notice: Subject to any disclaimer, the term of this patent is extended or adjusted under 35 U.S.C. 154(b) by 343 days.

(21) Appl. No.: 17/556,150

(22) Filed: Dec. 20, 2021

(65) Prior Publication Data

US 2022/0192335 A1 Jun. 23, 2022

Related U.S. Application Data

(60) Provisional application No. 63/127,191, filed on Dec. 18, 2020.

(51) Int. Cl.
*A45C 13/00* (2006.01)
*A45C 11/00* (2006.01)
*A45C 13/10* (2006.01)
*H01F 7/02* (2006.01)

(52) U.S. Cl.
CPC ............ *A45C 11/00* (2013.01); *A45C 13/005* (2013.01); *A45C 13/1069* (2013.01); *H01F 7/0231* (2013.01); *A45C 2011/001* (2013.01)

(58) Field of Classification Search
CPC ... A45C 11/00; A45C 13/005; A45C 13/1069; A45C 2011/001; H01F 7/0231; H01F 7/0252
USPC ....................................................... 455/575.8
See application file for complete search history.

(56) References Cited

U.S. PATENT DOCUMENTS 9,967,648 B2 * 5/2018 Panecki ............... H04R 1/1025
10,212,506 B2 2/2019 Panecki et al.
10,264,341 B2 4/2019 Andrikowich et al.
10,637,290 B2 4/2020 Ueda
10,687,135 B1 6/2020 Palupunoori et al.
2003/0201690 A1 * 10/2003 Mori ...................... H02K 23/30 310/264
2011/0199097 A1 * 8/2011 Hartsough ......... A61B 5/14532 324/629
2017/0093079 A1 * 3/2017 Wagman .............. H04R 1/1075
2017/0094395 A1 * 3/2017 McPeak ................... H04B 5/79

(Continued)

OTHER PUBLICATIONS

Great Magtech (Xiamen) Electric Co., Ltd., "Neodymium Magnet", 2019, 22 pages.

*Primary Examiner* — Tan H Trinh

(57) ABSTRACT

A case for a portable electronic device includes a housing, a lid, and a hinge rotatably coupling the lid to the housing such that the lid is operable between an open position and a closed position. The hinge includes a first multipole magnet coupled to the lid such that the first multipole magnet rotates with the lid. A second multipole magnet is coupled to the housing and is arranged coaxially with the first multipole magnet and such that the first multipole magnet and the lid rotate relative to the second multipole magnet. The lid is unstable between the open and closed positions, such that, between the open position and the closed position, the lid is biased toward either the open position or the closed position depending on an angle of orientation of the lid relative to the housing.

21 Claims, 15 Drawing Sheets

(56) References Cited

U.S. PATENT DOCUMENTS

| | | | | |
|---|---|---|---|---|
| 2018/0096770 | A1* | 4/2018 | Danielson .............. | H04R 1/105 |
| 2021/0063499 | A1* | 3/2021 | Ding .................... | G01R 33/072 |
| 2021/0337303 | A1* | 10/2021 | Macomber ............... | H04R 1/10 |

* cited by examiner

CASES WITH MULTIPOLE MAGNET HINGES

CROSS-REFERENCE TO RELATED APPLICATIONS

This application is a continuation of U.S. Application No. 63/127,191, filed Dec. 18, 2020, which is incorporated herein by reference in its entirety.

BACKGROUND

This disclosure relates to cases with multipole magnetic hinges.

SUMMARY

All examples and features mentioned below can be combined in any technically possible way.

One aspect provides a case for a portable electronic device. The case includes a housing having a cavity to receive the electronic device, a lid, and a hinge rotatably coupling the lid to the housing such that the lid is operable between an open position in which the cavity is exposed and a closed position in which the lid covers the cavity. The hinge includes a first multipole magnet coupled to the lid such that the first multipole magnet rotates with the lid relative to the housing. A second multipole magnet is coupled to the housing and is arranged coaxially with the first multipole magnet and such that the first multipole magnet and the lid rotate relative to the second multipole magnet. Due to an interaction between respective magnetic fields of the first and second multipole magnets, the lid is unstable between the open and closed positions, such that, between the open position and the closed position, the lid is biased toward either the open position or the closed position depending on an angle of orientation of the lid relative to the housing.

Implementations may include one of the following features, or any combination thereof.

In some implementations, in the open position respective magnetic poles on the first and second multipole magnets are oriented to attract each other.

In certain implementations, in the open position, respective magnetic poles on the first and second multipole magnets are arranged in a magnetically stable orientation relative to each other such that the lid is biased so as to remain in the open position.

In some cases, in the closed position, respective magnetic poles on the first and second multipole magnets are arranged in a magnetically unstable orientation relative to each other such that the lid is biased into contact with the housing so as to remain in the closed position.

In certain cases, in the closed position, respective magnetic poles on the first and second multipole magnets are oriented to repel each other such that the lid is biased so as to remain in the closed position.

In some examples, the first and second multipole magnets each include a multipole ring magnet with at least four magnetic sections that are arranged in a radial array.

In certain examples, the first and second multipole magnets each include an axially polarized multipole ring magnet with at least four magnetic sections that are arranged in a radial array.

In some implementations, each magnetic section includes a north magnetic pole arranged along one surface of the ring magnet extending between an inner radial edge of the magnet and an outer radial edge of the ring magnet and a south magnetic pole arranged along an opposite surface of the ring magnet extending between an inner radial edge of the ring magnet and an outer radial edge of the ring magnet.

In certain implementations, the magnetic sections of each of the first and second multipole magnets alternate in polarity along the corresponding radial array such that the north magnetic pole of each magnetic section is disposed between the south magnetic poles of the adjacent magnetic sections.

In some cases, the first and second multipole magnets are arranged such that magnetic poles on the first multipole magnet align with magnetic poles of opposite polarity on the second multipole magnet when the lid is in the open position.

In certain cases, the first and second multipole magnets each include a radially polarized multipole ring magnet with at least four magnetic sections that are arranged in a radial array.

In some examples, each magnetic section includes a north magnetic pole arranged along either an inner radial edge or an outer radial edge of the ring magnet and a south magnetic pole arranged along the other of the inner radial edge or the outer radial edge of the ring magnet.

In certain examples, each magnetic section has a first magnetic pole on the outer radial edge of the ring magnet and a second, opposite, magnetic pole on the inner radial edge of the ring magnet.

In some implementations, the magnetic sections of each ring magnet alternate in polarity along the radial array such that a north magnetic pole of each magnetic section is disposed between respective south magnetic poles of adjacent magnetic sections along inner and outer radial edges of the corresponding one of the ring magnets.

In certain implementations, the first and second multipole magnets each include a multipole ring magnet with a sectored magnetization.

In some cases, each multipole ring magnet includes at least four magnetic sections that are arranged in a radial array and each magnetic section includes a north magnetic pole and a south magnetic pole, and wherein each magnetic pole is in the form of a sector of the ring magnet and each magnetic pole is disposed between sectors having opposite polarity such that the sectors alternate in polarity around the ring magnet.

In certain cases, the first and second multipole magnets are arranged such that magnetic poles on the first multipole magnet align with magnetic poles of opposite polarity on the second multipole magnet in each of the stable positions.

In some examples, the cavity is open at an upper surface of the housing and the lid rotates in a plane of rotation that intersects the upper surface of the housing.

In certain examples, the cavity is open at an upper surface of the housing and the lid is configured to rotate in a plane of rotation that is substantially parallel to the upper surface of the housing.

In some implementations, the first and second multipole magnets are arranged such that a cogging force resulting from interaction of respective magnetic fields of the first and second multipole magnets provides a plurality of discrete stable positions, including the open position and the closed position, between the lid and the housing.

In certain implementations, respective magnetic poles on the first and second multipole magnets are oriented to attract each other in the plurality of discrete stable positions.

In some cases, when the lid is positioned between the plurality of discrete stable positions, the respective magnetic poles on the first and second multipole magnets are oriented to repel each other such that the lid is biased towards one of the plurality of discrete stable positions.

In certain cases, the first and second multipole magnets are arranged such that magnetic poles on the first multipole magnet align with magnetic poles of opposite polarity on the second multipole magnet in each of the stable positions.

Implementations may include one of the above features, or any combination thereof.

Figure 1A:
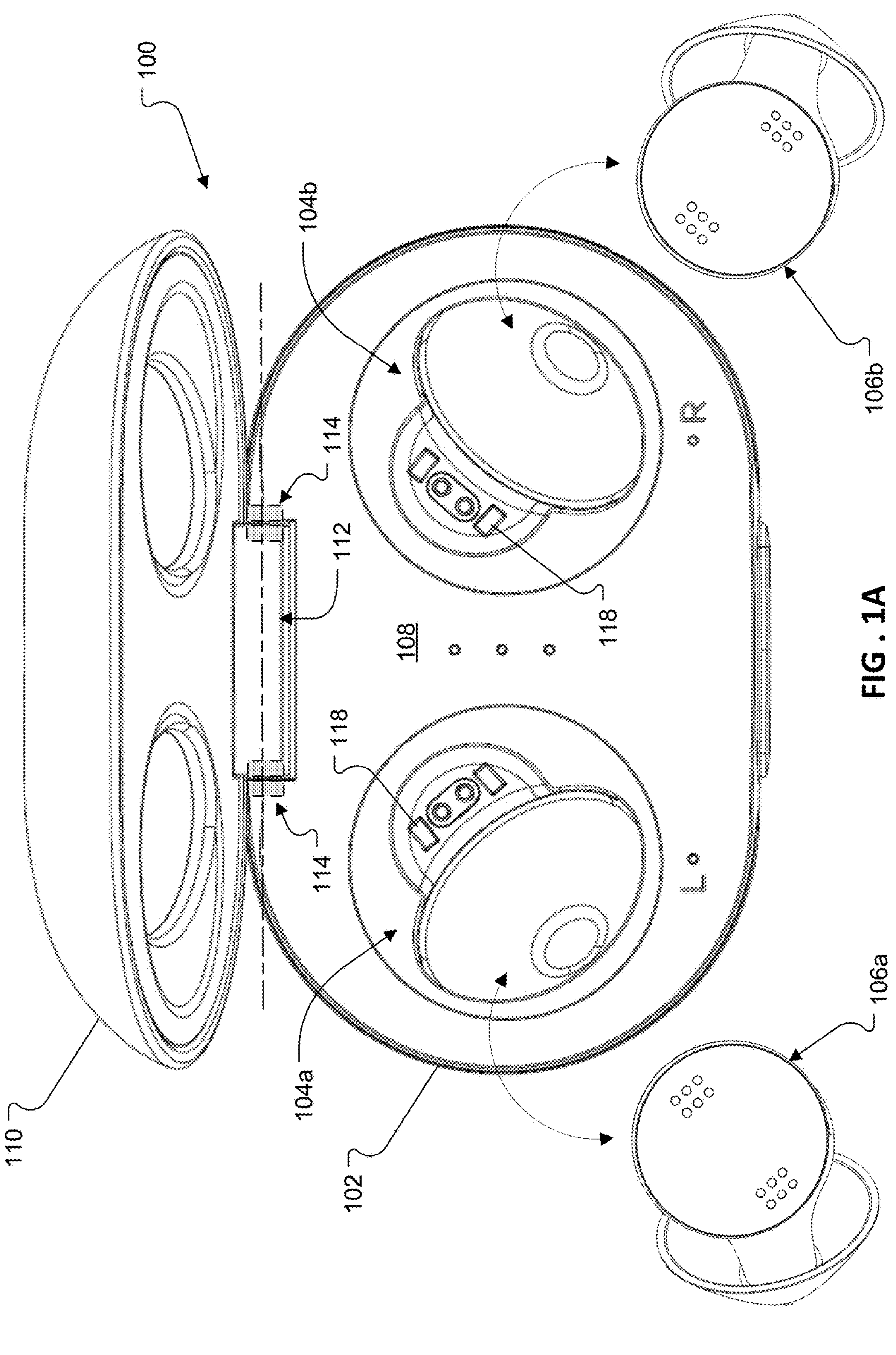
FIG. 1A is a top view of a case for one or more portable electronics devices, shown in the form of wireless earbuds, with its lid in an open position.
Figure 1B:
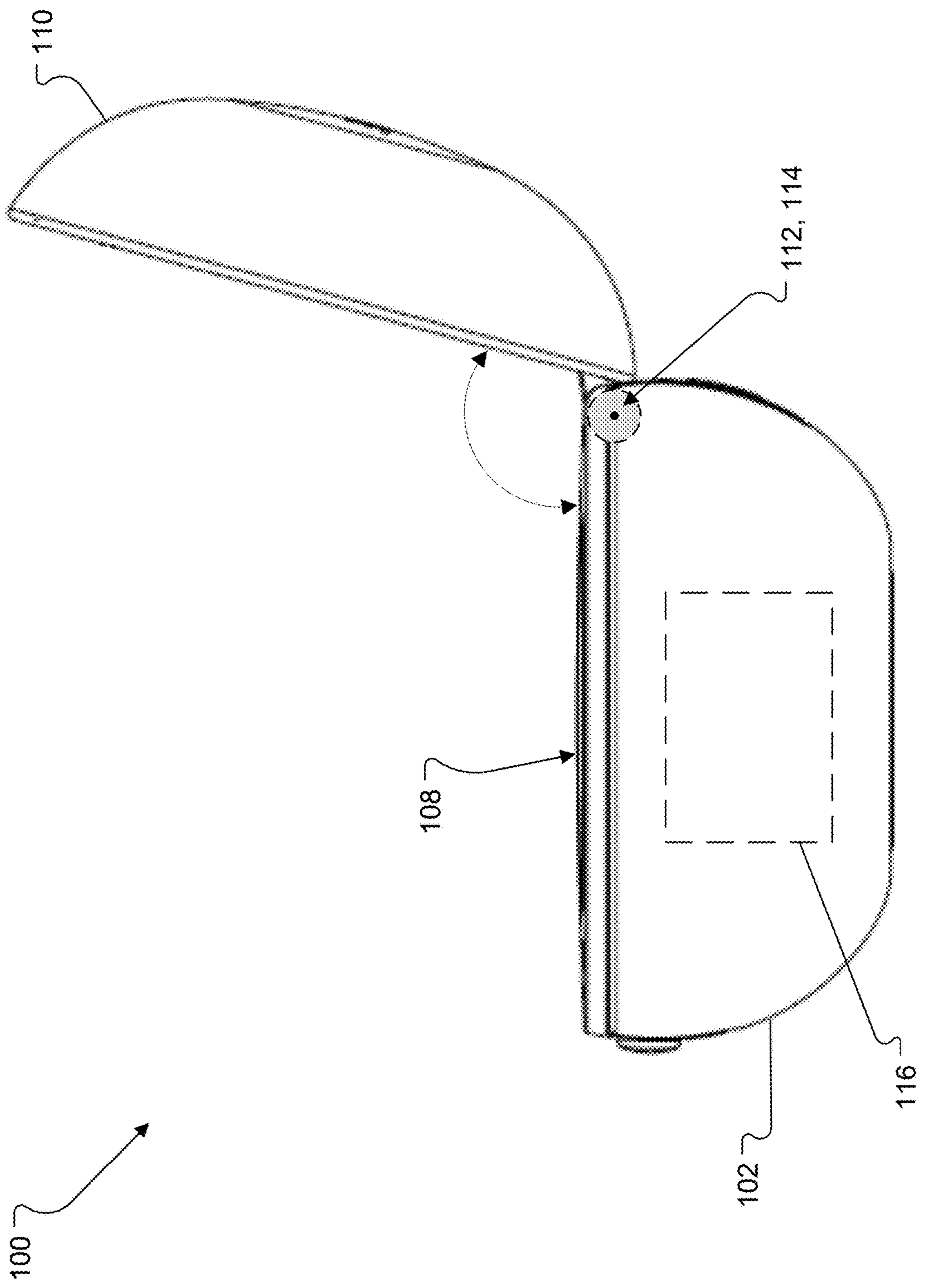
FIG. 1B is a side view of the case of FIG. 1A.
Figure 1C:
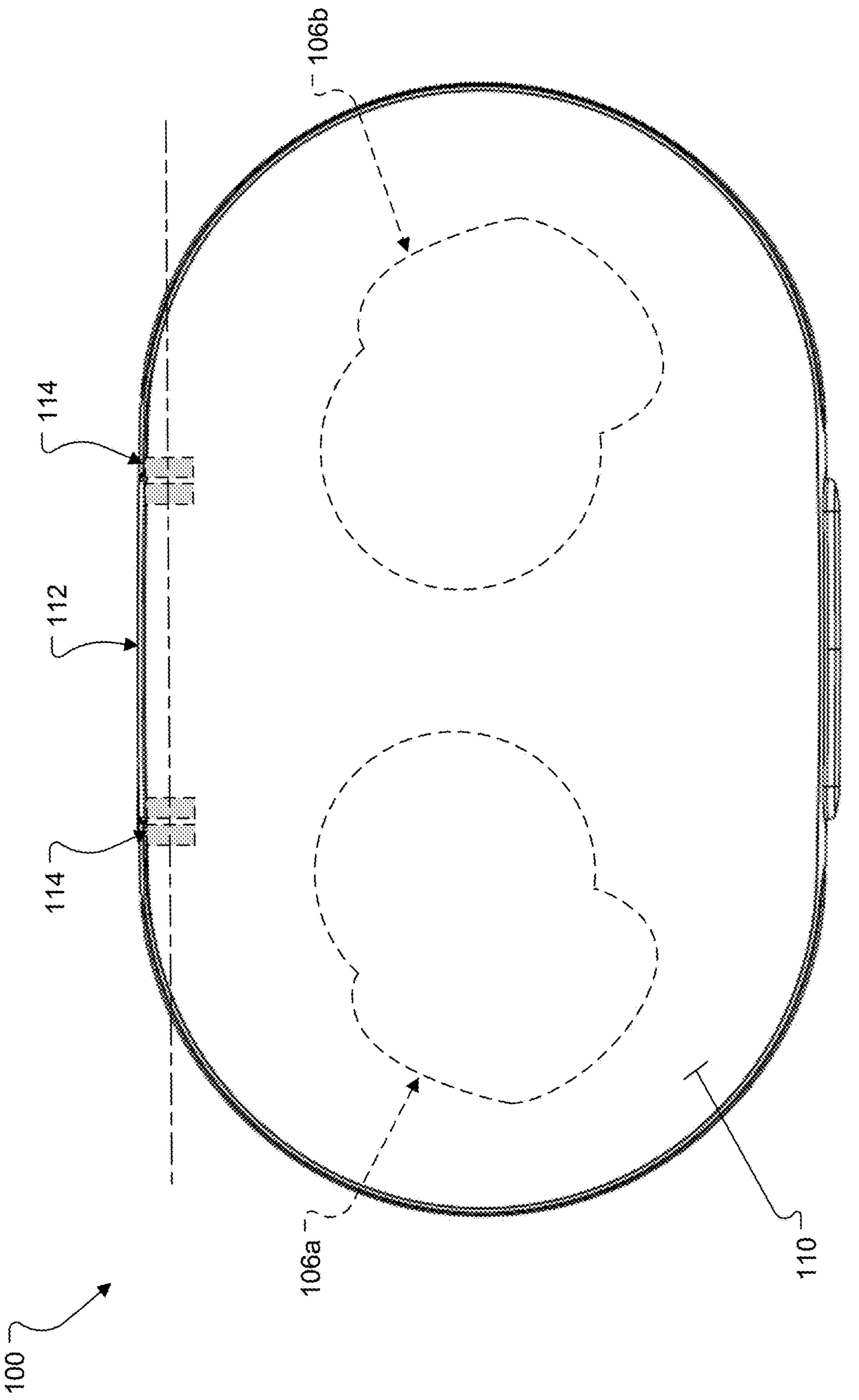
FIG. 1C is a top view of the case of FIG. 1A with its lid in a closed position.
Figure 1D:
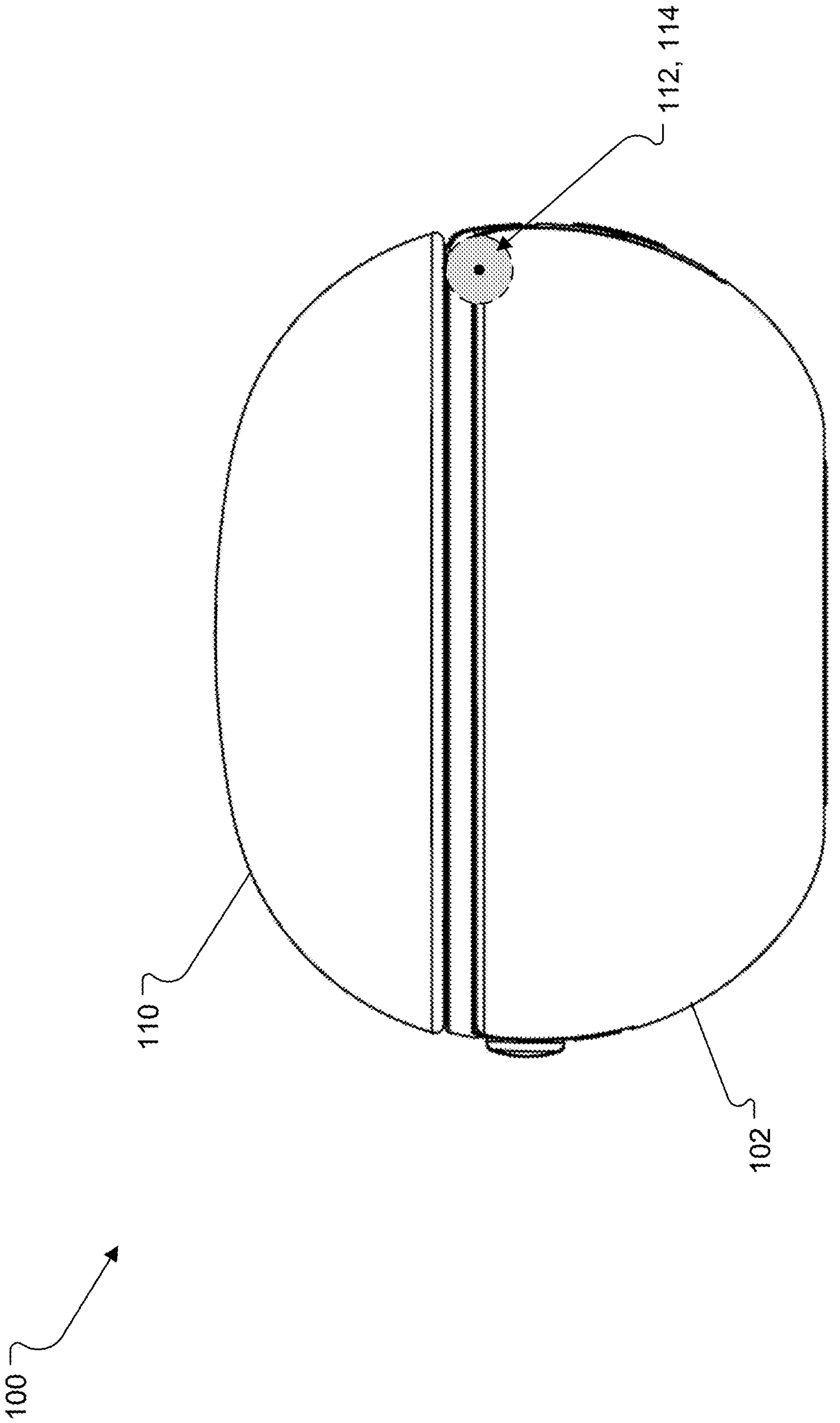
FIG. 1D is a side view of the case of FIG. 1C.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

FIGS. 1A-1D illustrate a case 100 for one or more portable electronics devices, shown in the form of wireless earbuds. The case 100 includes a housing 102 (a/k/a "body") having one or more cavities 104*a*, 104*b* configured to receive a pair of earbuds 106*a*, 106*b* (FIG. 1A). The cavities 104*a*, 104*b* can be positioned adjacent each other on opposite sides of a center plane of the case 100. Each cavity can be sized and shaped to match that of its respective earbud 106*a*, 106*b*. Each cavity 104*a*, 104*b* is open at an upper surface 108 of the housing 102. Implementations of the disclosure are not limited to any particular shape, configuration or number of cavities 104*a*, 104*b* and in other implementations the cavies 104*a*, 104*b* can have different shapes to accommodate difference types of earbuds, different configurations and/or can be a single cavity or more than two cavities.

The case 100 further includes a lid 110 that is rotatably attached to the housing 102 via hinge 112. The hinge 112 rotatably couples the lid 110 to the housing 102 such that the lid 110 is operable between a closed position (FIGS. 1C & 1D) where the lid is aligned over the cavities 104*a*, 104*b* fully enclosing the earbuds 106*a*, 106*b*, within the housing 102, and an open position (FIGS. 1A & 1B) where the lid 110 is displaced from the housing 102 and the cavities 104*a*, 104*b* such that a use can remove the earbuds 106*a*, 106*b* from the cavities 104*a*, 104*b* or replace the earbuds 106*a*, 106*b* within the cavities. The hinge 112 includes one or more multipole magnet pairs 114 (two shown in FIGS. 1A & 1C) that provide the lid 110 with a bi-stable operation, as described more fully below. In some implementations, the case 100 can also include a charging system 116 (FIG. 1B) configured to charge the earbuds 106*a* 106*b*; one or more magnets 118 (FIG. 1A) configured to orient and retain the earbuds 106*a*, 106*b* within the cavities 104*a*, 104*b*; and other features described below.

Figure 2A:
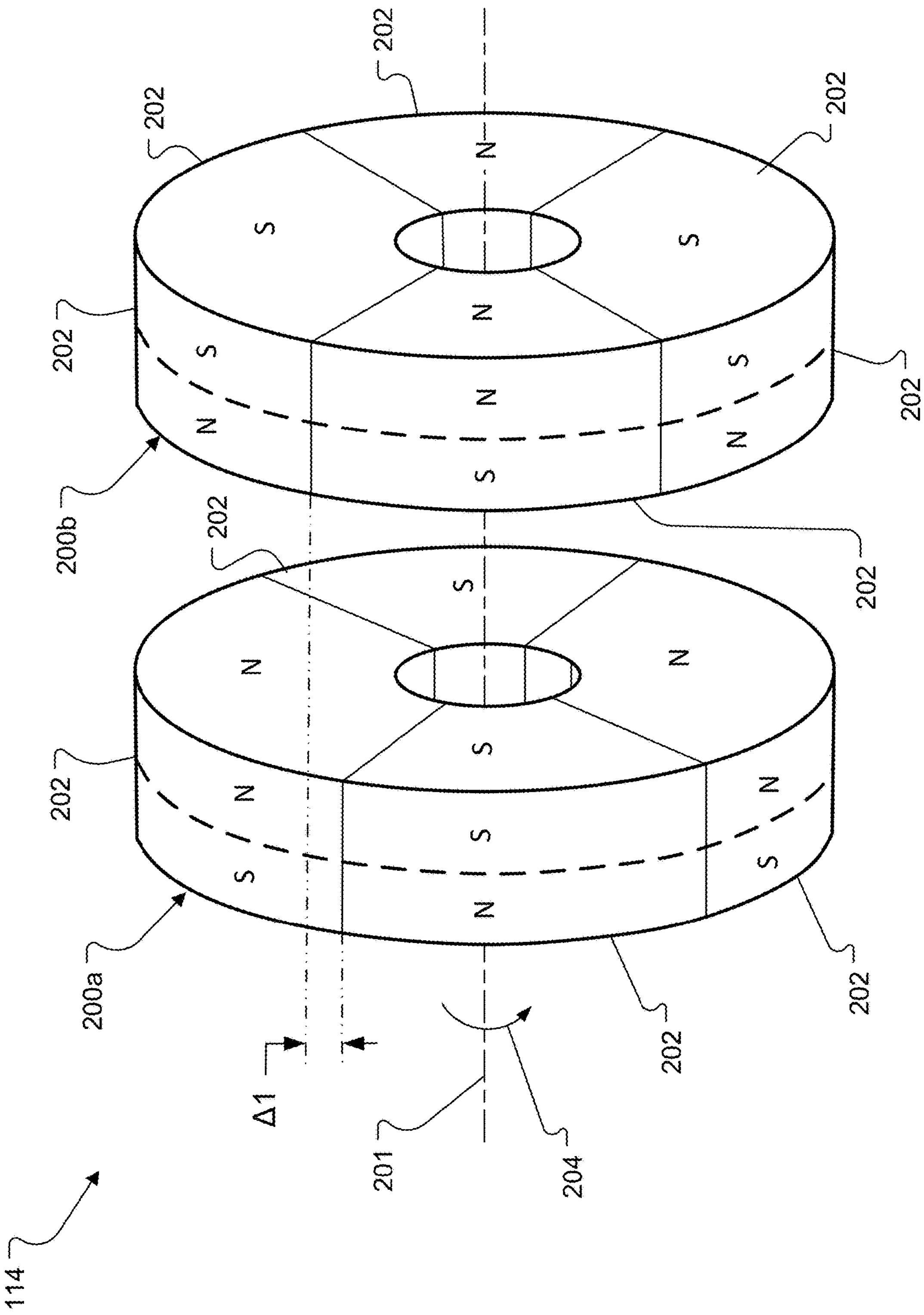
FIGS. 2A through 2C are perspective views of a pair of multipole magnets in various orientations relative to each other.
Figure 2B:
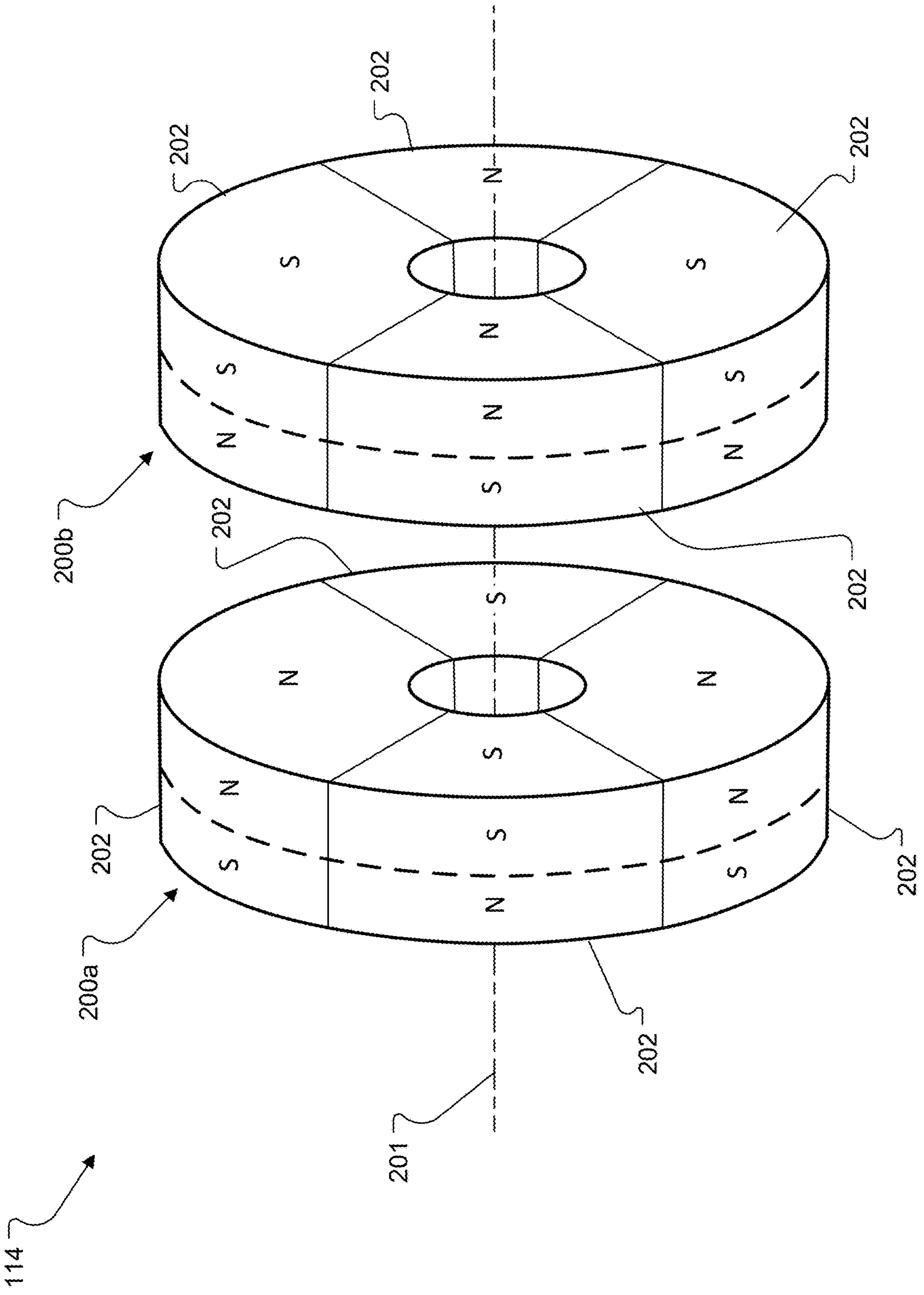
Figure 2C:
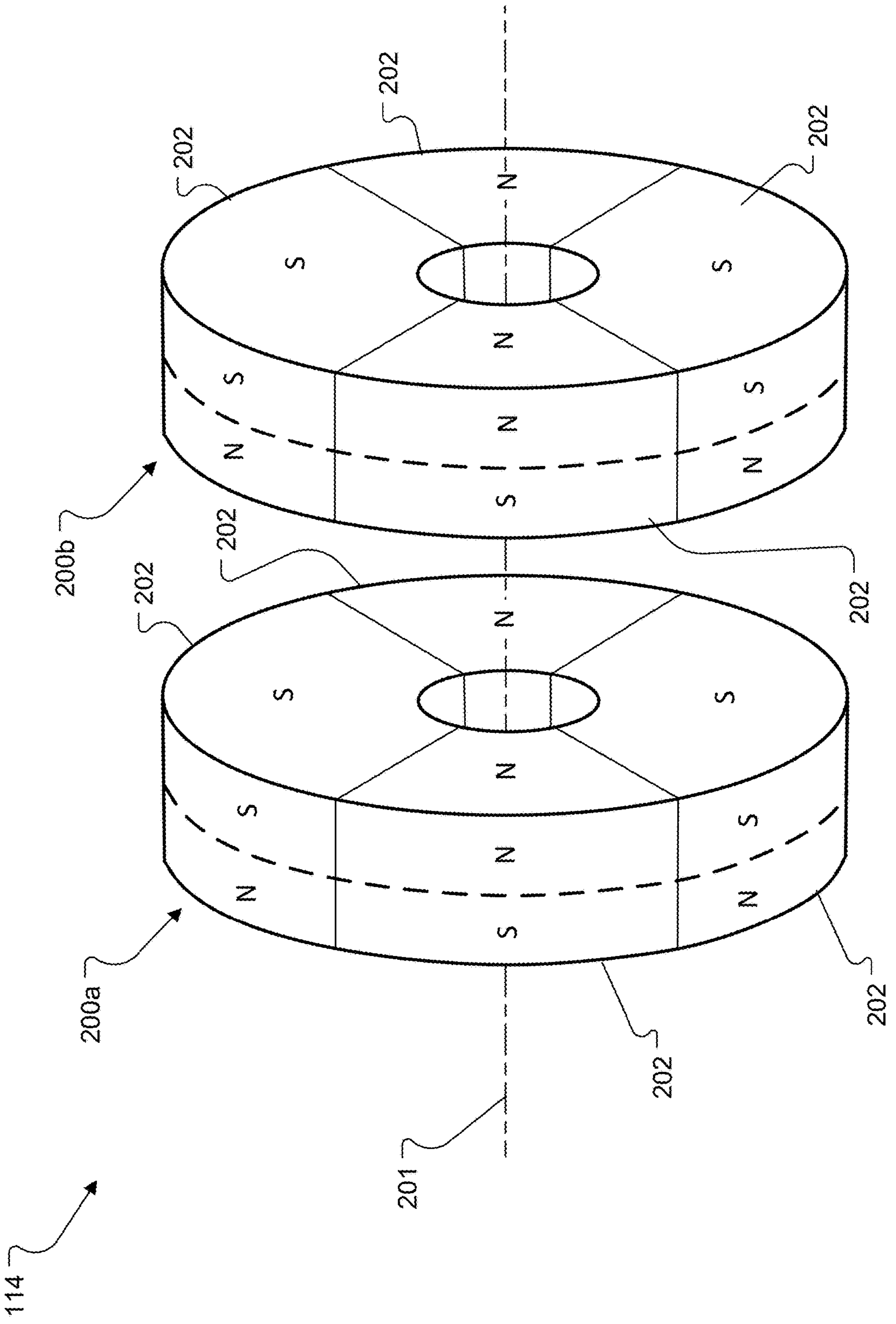

With reference to FIGS. 2A-2C, each multipole magnet pair 114 includes a first multipole magnet 200*a* that is coupled to the lid 110 and a second multipole magnet 200*b* that is coupled to the housing 102. Suitable multipole magnets are available from Ningbo Yunsheng Co., Ltd., Ningbo, China. The first multipole magnet 200*a* rotates about axis 201 of the hinge 112 with the lid 110 relative to the housing 102. The second multipole magnet 200*b* is arranged coaxially with the first multipole magnet 200*a* and is fixed to the housing 102 such that the lid 110 and the first multipole magnet 200*a* rotate relative to the second multipole magnet 200*b* and the case 102.

In the example illustrated in FIGS. 2A-2C, the first and second multipole magnets 200*a*, 200*b* each include an axially polarized multipole ring magnet with four magnetic sections 202 that are arranged in a radial array. As used herein "ring magnet" is intended to capture a cylindrical or disk-shaped magnet with a hole at its central axis. Each magnetic section 202 includes a north magnetic pole (N) arranged along one surface of the ring extending between an inner radial edge of the ring and an outer radial edge of the ring and a south magnetic pole (S) arranged along an opposite surface of the ring extending between an inner radial edge of the ring and an outer radial edge of the ring. The magnetic sections 202 alternate in polarity along the radial array such that the north magnetic pole N of each magnetic section 202 is disposed between the south magnetic poles S of the adjacent magnetic sections 202 along the surfaces of the rings. The first and second multipole magnets 200*a*, 200*b* of each multipole magnet pair 114 are arranged such that magnetic poles on the first multipole magnet 200*a* align with poles of opposite polarity on the second multipole magnet 200*b* when the lid is in the open position (FIG. 2C). In the closed position (FIG. 2A) respective magnetic poles on the first and second multipole magnets are arranged in an unstable orientation relative to each other such that the lid is biased so as to remain in the closed position. That is, in the closed position, the respective magnetic poles on the first and second multipole magnets 200*a* 200*b* are oriented to repel each other such that the lid is biased so as to remain in the closed position. As shown in FIG. 2A, the respective magnetic poles of the first and second multipole magnets 200*a*, 200*b* are arranged at a rotational offset $\Delta 1$, e.g., of −10 degrees, relative to each other such that dissimilar magnetic poles (i.e., magnetic poles that attract each other) on the first and second multiple pole magnets 200*a*, 200*b* partially overlap each other when the lid 110 is in the closed position. Likewise, similar magnetic poles (i.e., magnetic poles that repel each other) partially overlap each other when the lid 110 is in the closed position. This rotational offset of the first and second multipole magnets 200*a*, 200*b* and the corresponding partial overlap (axial alignment) of both similar and dissimilar magnetic poles of the first and second multipole magnets 200*a*, 200*b* causes the lid to be biased so as to remain in the closed position. Or, to put it another way, the rotational offset Δ1 of the first and second multipole magnets 200*a*, 200*b* and the corresponding interaction between respective magnetic fields of the first and second multipole magnets 200*a*, 200*b* results in a rotational torque that makes the lid 110 and the first multipole magnet 200*a* to want to rotate clockwise (in the direction of arrow 204 in FIG. 2A) about the axis. This negative rotational torque biases the lid 110 in the closed position.

At zero (0) degree and 180-degree rotational offsets, the respective magnetic poles of like polarity on the first and second multipole magnets 200*a*, 200*b* are lined up exactly and there are unstable equilibrium points, see, e.g., FIG. 2B which shows a zero (0) degree rotational offset between the first and second multipole magnets 200*a*, 200*b*. At 90 degree and 270-degree rotations, the dissimilar magnetic poles of the first and second multipole magnets 200*a*, 200*b* are lined up and these are stable equilibrium points. FIG. 2C shows a 90-degree rotational offset corresponding to the open position. In this configuration, the lid 110 is stable at an angle of 100 degrees relative to the housing 102 in the open position (i.e., having rotated from the −10-degree rotational offset to a +90-degree rotational offset between the closed and open positions).

While FIGS. 1A-2C illustrate an implementation in which the respective magnetic poles of the first and second multipole magnets are arranged so as to be in a stable orientation when the lid is in the open position and an unstable orientation when the lid is in the closed position, in other implementations the case can be configured such that the first and second multipole magnets can be oriented in a plurality of discrete positions of stable equilibrium to provide a plurality of (e.g., two) discrete stable orientations for the lid relative to the housing, one being the closed position and the other being the open position, e.g., at 180-degrees of rotation of the lid relative to the housing. That is, the first and second multipole magnets may be arranged so as to be in a stable equilibrium when the lid is in both the open position and the closed position. In such a configuration, the respective magnetic poles on the first and second multipole magnets would be oriented to repel each other such that the lid is biased towards one of the plurality of discrete stable positions when the lid is positioned between the plurality of discrete stable positions. As in the implementation described above, the second multipole magnet can be arranged coaxially with the first multipole magnet and such that a cogging force resulting from interaction of respective magnetic fields of the first and second multipole magnets provides a plurality of discrete stable positions in which dissimilar magnetic poles of the first and second multipole magnets are aligned in stable equilibrium, including the open position and the closed position, between the lid and the housing. Additional stable positions may be provided by including more magnetic sections.

Figure 3:
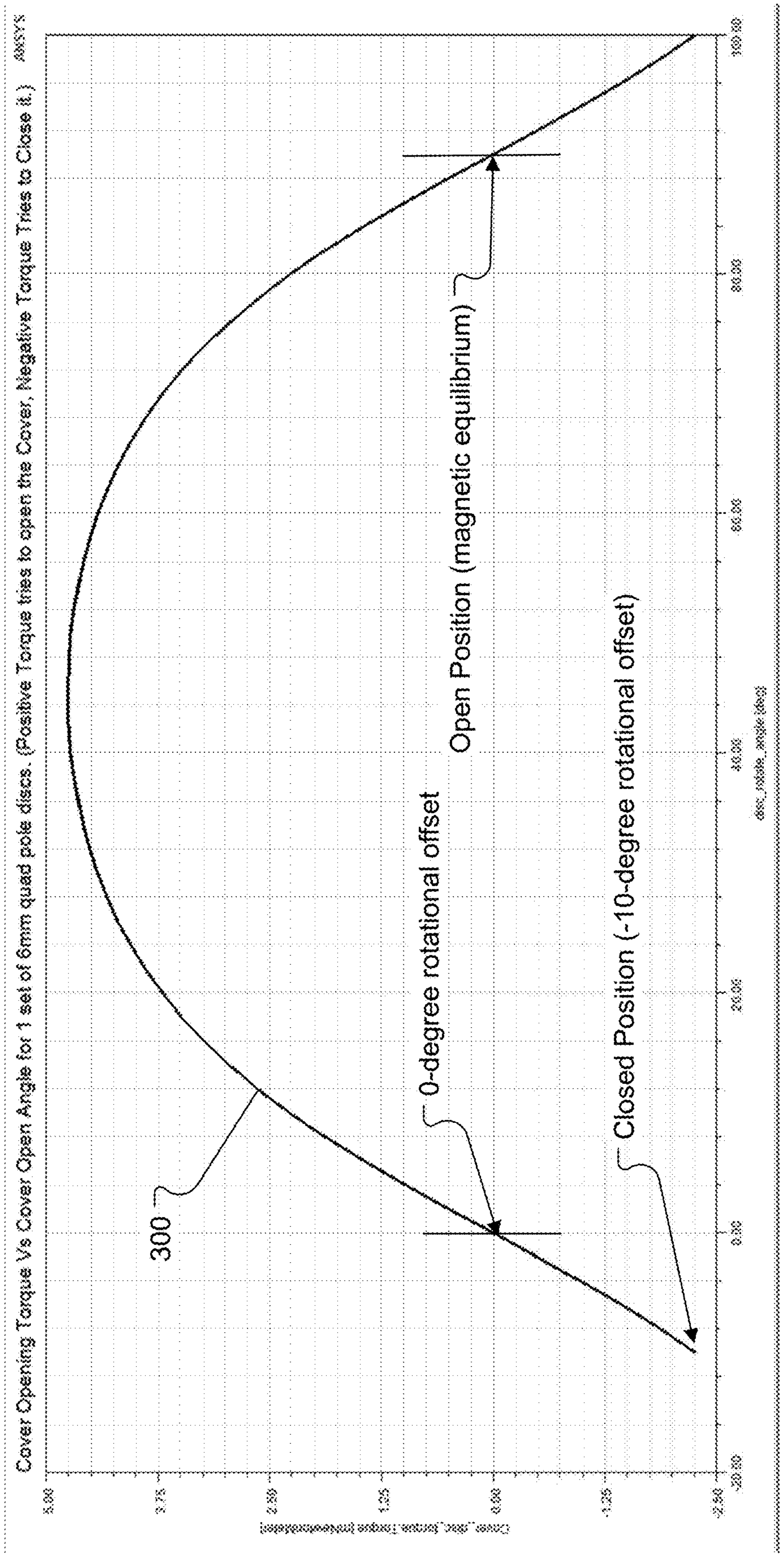
FIG. 3 is torque curve representing the torque produced as a function of rotational offset of the multipole magnets of FIGS. 2A-2C.

FIG. 3 illustrates a torque curve 300 representing the torque produced as a function of rotational offset of the first and second multipole magnets. As shown in FIG. 3, at −10 degree rotational offset (corresponding to the relationship of the magnets illustrated in FIG. 2A) a negative torque is produced, and, as a result the first multipole magnet wants to rotate clockwise to close the lid 100 and keep it in the closed position against the housing 102—the housing 102 itself preventing further rotation of the lid 110, thus, in the closed position, the lid is mechanically stable, but magnetically unstable. At zero degrees rotational offset (corresponding to the relationship of the magnets illustrated in FIG. 2B), magnet poles of the same polarity are lined up exactly and it is an unstable equilibrium. Between the zero and 90-degree rotational offset positions, the torque is positive and the first multipole magnet 200*a* and the lid 110 want to rotate counter-clockwise to open the cover towards the stable, open position. And, at 90-degree rotational offset of the first multipole magnet 200*a* relative to the second multipole magnet 200*b* (corresponding to the relationship of the magnets illustrated in FIG. 2B), dissimilar/attracting magnetic poles line up and it is a stable equilibrium with the lid 110 open at 100 degrees relative to the housing 102 and the interaction of the magnetic fields of the first and second multipole magnets 200*a*, 200*b* resists changing this position. Just beyond the 90-degree rotational offset position, representing over rotation of the lid 110, the respective magnetic poles of the first and second multipole magnets are again arranged in an unstable orientation and the torque goes negative again causing the lid 110 to be biased back toward the open position.

Figure 4:
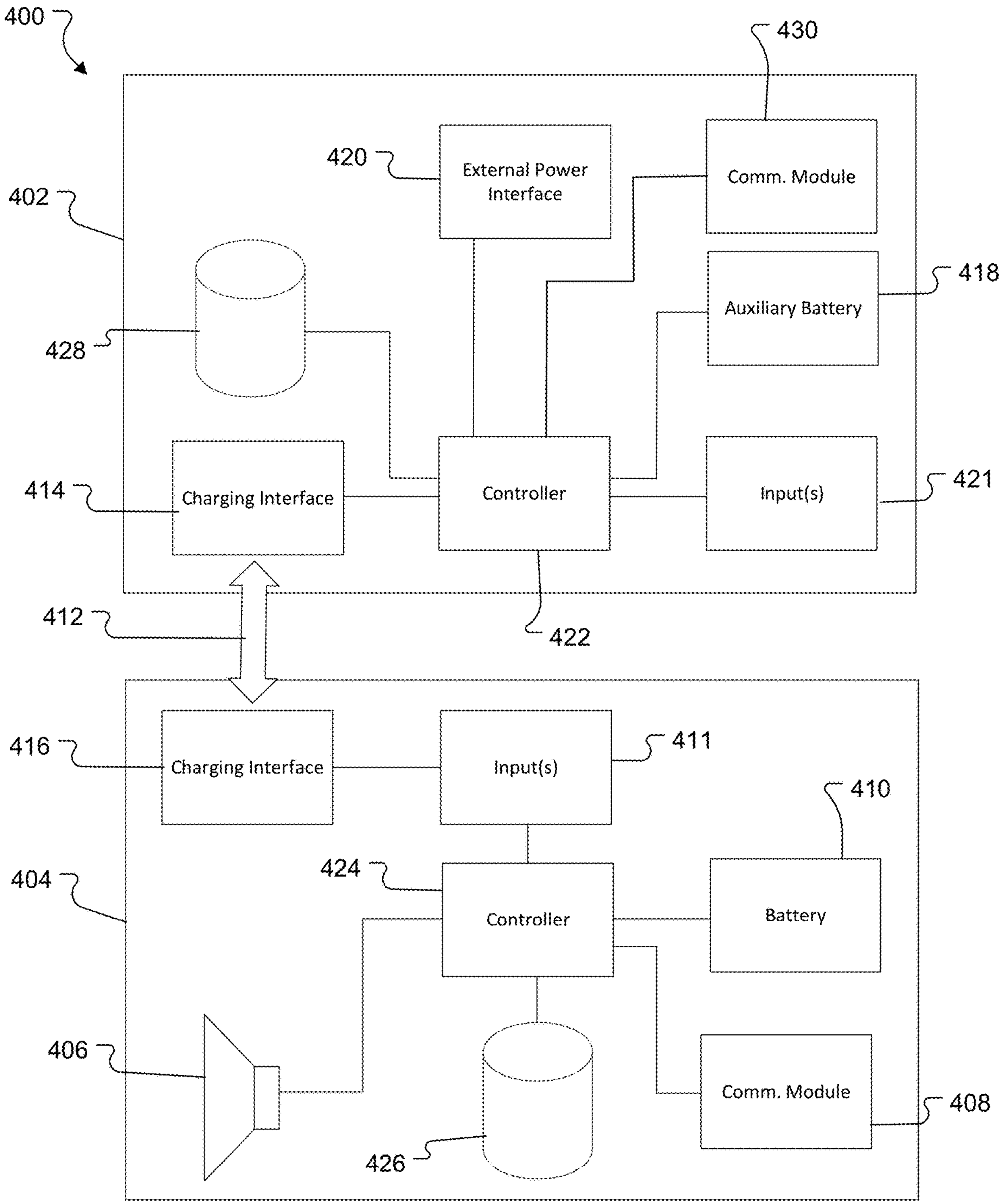
FIG. 4 is a schematic view of a system including a charging case and a portable electronic device according to an implementation of the present disclosure.
Figure 5A:
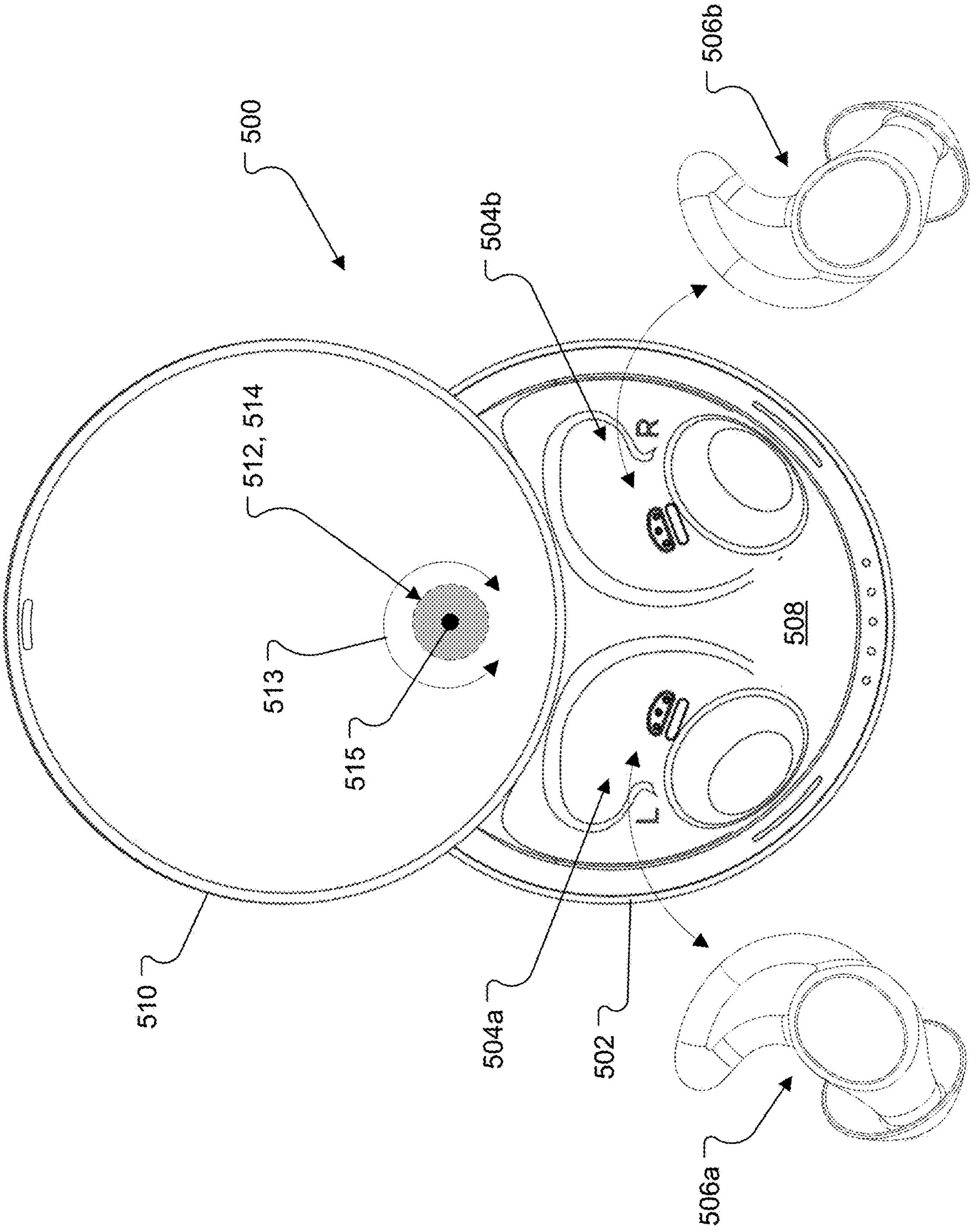
FIG. 5A is a top view of another implementation of a case for one or more portable electronics devices, shown in the form of wireless earbuds, with its lid in an open position.
Figure 5B:
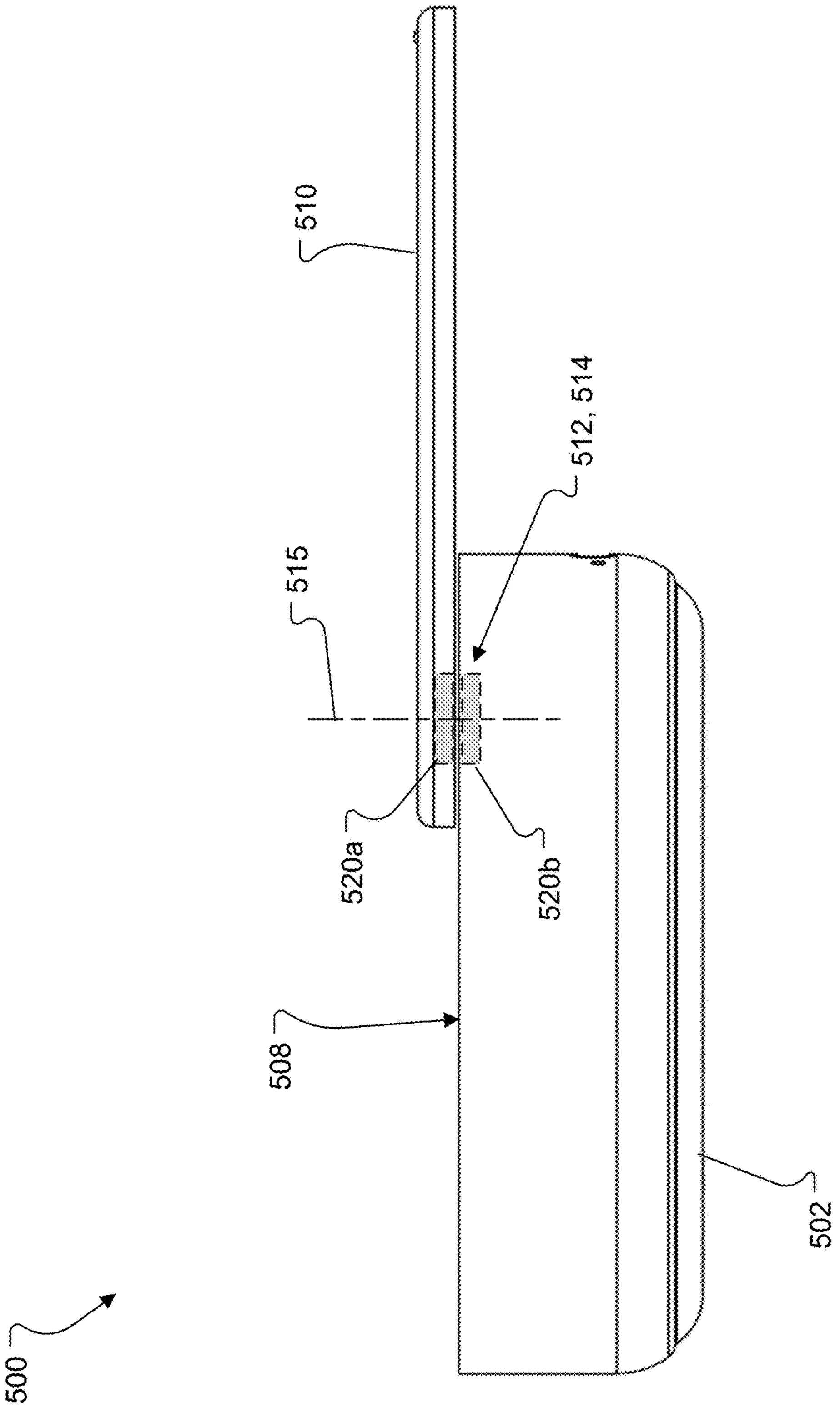
FIG. 5B is a side view of the case of FIG. 5A.
Figure 5C:
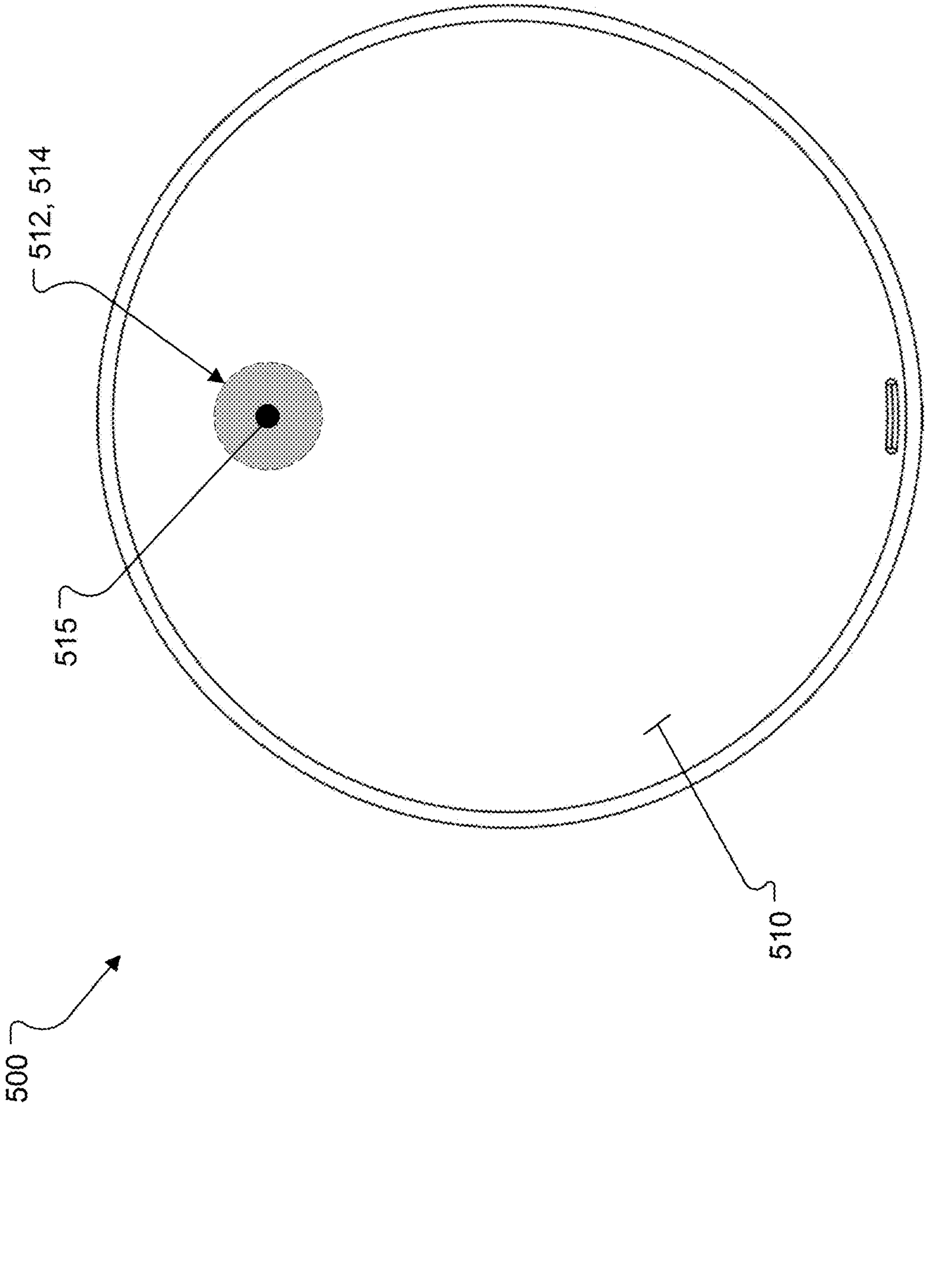
FIG. 5C is a top view of the case of FIG. 5A with its lid in a closed position.
Figure 5D:
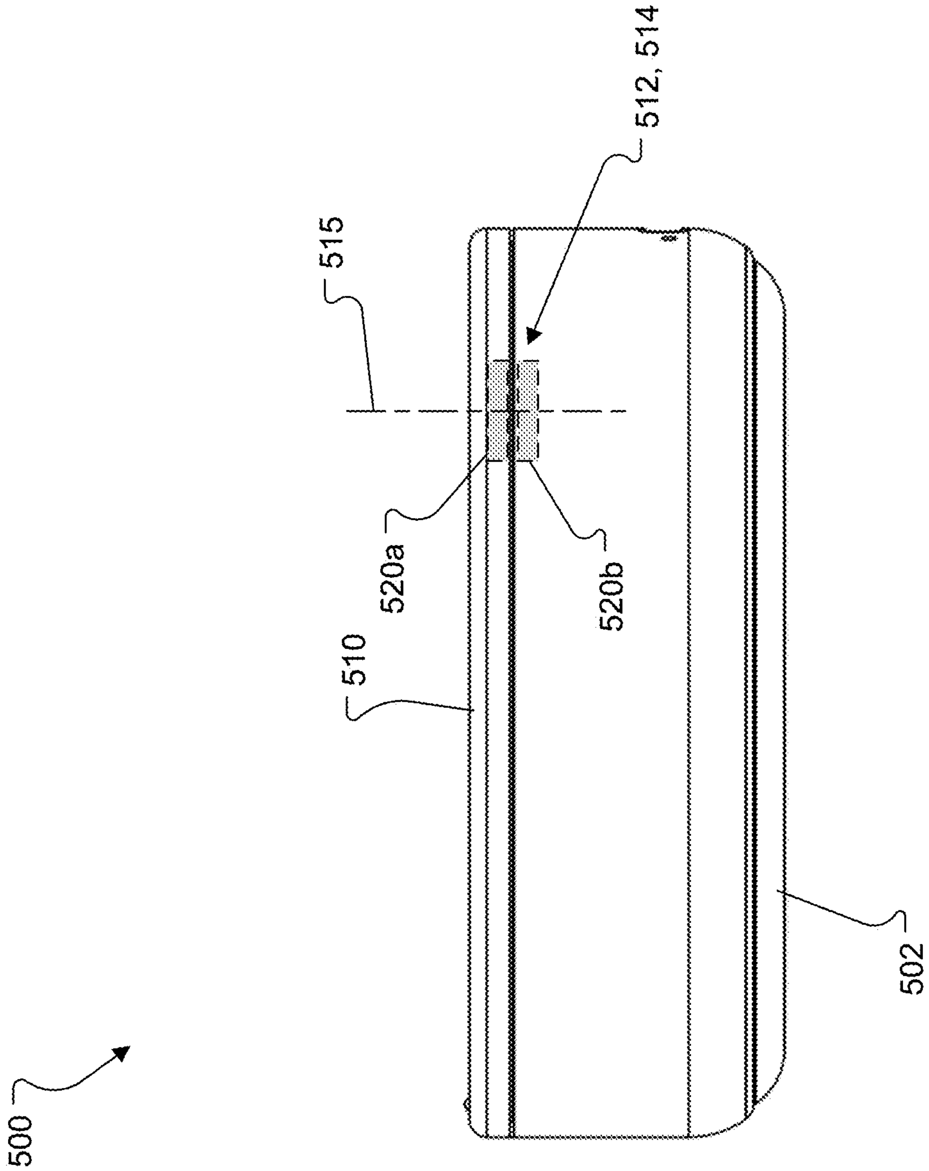
FIG. 5D is a side view of the case of FIG. 5C.

FIG. 4 schematically depicts a system 400 according to an implementation of the present disclosure. The system 400 includes a case 402 and one or more portable electronics devices, e.g., a wireless audio device 404. The wireless audio device 404 may be or include any number of audio devices, such as headphones, earphones, earbuds, headsets, etc. Additionally, the wireless audio device may be or include any wearable device intended to be worn on or about a user's head or ears, such as a pair of glasses, a helmet, a hat, and various other types of devices such as head, shoulder or body-worn acoustic devices that include or are connected to one or more acoustic drivers to produce sound, with or without contacting the ears of a user. To this end, the wireless audio device 404 includes a speaker 406 configured to produce sound in response to an audio signal sent to the speaker 406. The wireless audio device 404 can be representative of the earbuds 106*a*, 106*b* and the case 402 can be representative of the case 100 discussed above with respect to FIGS. 1A-1D.

The wireless audio device 404 includes a communication module 408 that enables it to wirelessly transmit and/or receive information, such as streamed audio data (converted into sound output by the speaker 406) and/or control commands from a remote audio source. Remote audio sources may include a smartphone, laptop, desktop computer, tablet, or other computing device in communication with the wireless audio device 404 via the communication module 408. Any desired wireless technology, standard, or protocol may be used, such as Bluetooth, Wi-Fi, etc. The wireless audio device 404 includes a battery 410 to enable wireless operation of the wireless audio device 404 when it is not connected to any external power source (such as a headphone jack utilized by typical wired audio devices).

The wireless audio device 404 may also include one or more inputs 411. The inputs 411 may include a microphone input and/or a button or sensor for receiving touch input. The inputs 411 may, for example, include a capacitive touch sensor and/or an accelerometer for receiving touch input. The inputs 411 may be configured to receive user input for Bluetooth pairing, adjusting audio volume, answering a call, audio transport controls, and/or adjusting a level of active noise cancellation provided by the wireless audio device 404.

The case 402 may be any device external to the wireless audio device 404 that is configured to charge the wireless audio device 404 when arranged together, such as a case, housing, or container for holding and/or protecting the wireless audio device 404 when the wireless audio device 404 is not in use, during transit or storage, etc. The case 402 is intended to charge the battery 410 of the wireless audio device 404 when an electrical or power transfer connection 412 is formed between a charging interface 414 of the case 402 and a charging interface 416 of the wireless audio device 404. The charging interfaces 414 and 416 may be electrical contacts that are physically engaged together to create an electrical connection therebetween. In another example, the charging interfaces 414 and 416 may include components arranged for inductive charging when brought into proximity of each other, such as induction coils. If desired, the power transfer connection 412 may be managed or controlled via any technology, standard, or protocol, such as Universal Serial Bus (USB), Qi, etc.

To provide power to the battery 410 via the power transfer connection 412, the case 402 includes an auxiliary battery 418 and/or an external power interface 420 in communication with the charging interface 414. The auxiliary battery 418 may generally resemble the battery 410 and/or be of a different type or capacity (such as having a greater capacity). Similarly, the external power interface 420 may be arranged akin to the charging interface 414 as discussed above, e.g., using the same or different standards, protocols, and/or technologies than the charging interface 414 and 416. For example, the external power interface 420 may be adapted to plug into a wall outlet for transferring power to the wireless audio device 404 via the charging interfaces 414 and 416.

The case 402 may also include one or more inputs 421, e.g., a touch sensitive sensor or button. The inputs 421 on the case 402 may be used, for example, to cause the wireless audio device 404 to enter a wireless pairing mode, and/or to toggle between various remote devices that are wirelessly coupled to the wireless audio device 404.

The operation of the case 402 and the wireless audio device 404 (including with respect to the transfer of power from the case 402 to the wireless audio device 404), may be managed, controlled, or facilitated respectively by a controller 422 in the case 402 and/or a controller 424 in the wireless audio device 404. The controllers 422 and 424 may arranged as processors and/or include any suitable software and hardware useful for implementing the features and functionality described here.

The controller 424 includes or is in communication with a memory module 426, which may take any desired form known in the art, such solid-state or other non-volatile memory formats. The memory module 426 may store one or more software programs (e.g., a charging algorithm) for execution by the controller 424. Alternatively, or additionally, upon connection or pairing (these terms used interchangeably herein) of the wireless audio device 404 to an audio source (such as Bluetooth pairing with a smartphone or other remote computing device), the wireless audio device 404 may be configured (via the controller 424) to store information pertaining to the paired audio source in the memory module 426.

Likewise, the controller 422 includes or is in communication with a memory module 428, which may take any desired form known in the art, such solid-state or other non-volatile memory formats. The memory module 428 may store one or more software programs (e.g., a charging algorithm) for execution by the controller 422.

The case 402 may also include a communication module 430 that enables it to wirelessly transmit and/or receive information. For example, the case 402 may be used to wirelessly transmit firmware updates to the wireless audio device 404. The case 402 may receive the firmware updates from a remote source, such as a smartphone, laptop, desktop computer, tablet, or other computing device in communication with the case 402, e.g., via the communication module 430. The case may also receive information, such as battery status information, from the wireless audio device 414. In some implementations, the charging interface 414, the auxiliary battery 418, the external power interface 420, the controller 422, the memory module 428, and the communication module 430 are all representative components of the charging system 116 shown in FIG. 1B.

While FIGS. 1A-1D illustrate an implementation of a case with a clam shell style closure that include a lid that rotates in a plane of rotation that intersects an upper surface of a housing, other implementations are contemplated. For example, FIGS. 5A-5D illustrate an implementation of a case that includes a lid that is configured to rotate in a plane of rotation that is substantially parallel to an upper surface of a housing.

FIGS. 5A-5D illustrate a case 500 for one or more portable electronics devices, shown in the form of wireless earbuds. The case 500 includes a housing 502 (a/k/a "body") having one or more cavities 504*a*, 504*b* configured to receive a pair of earbuds 506*a*, 506*b*. The cavities 504*a*, 504*b* can be positioned adjacent each other on opposite sides of a center plane of the case 500. Each cavity can be sized and shaped to match that of its respective earbud 506*a*, 506*b*. Each cavity 504*a*, 504*b* is open at an upper surface 508 of the housing 502. Implementations of the disclosure are not limited to any particular shape, configuration or number of cavities 504*a*, 504*b* and in other implementations the cavies 504*a*, 504*b* can have different shapes to accommodate difference types of earbuds, different configurations and/or can be a single cavity or more than two cavities.

As mentioned above, the case 500 further includes a lid 510 that is rotatably attached to the housing 502 via hinge 512 arranged along the upper surface 508 of the housing 502. The hinge 512 rotatably couples the lid 510 to the housing 502 such that the lid 510 is operable between a closed position (FIGS. 5C & 5D) where the lid 510 is aligned over the cavities 504*a*, 504*b* fully enclosing the earbuds 506*a*, 506*b*, within the housing 502, and an open position (FIGS. 5A & 5B) where the lid 510 is displaced from the housing 502 and the cavities 504*a*, 504*b* such that a use can remove the earbuds 506*a*, 506*b* from the cavities 504*a*, 504*b* or replace the earbuds 506*a*, 506*b* within the cavities. Notably, the lid 510 rotates about an axis of rotation 515 that extends outwardly from (e.g., perpendicular to) the upper surface 508 of the housing 502 and such that the lid 510 rotates (arrow 513) in a plane of rotation that is substantially parallel to the upper surface of the housing 502. This can allow for 360-degree rotation of the lid 510 without interference with the housing 502.

The hinge 512 includes a multipole magnet pair 514 that provides the lid 510 with a bi-stable operation. In some implementations, the case 500 can also include a charging system 516 configured to charge the earbuds 506*a* 506*b*; one or more magnets 518 configured to orient and retain the earbuds 506*a*, 506*b* within the cavities 504*a*, 504*b*; and other features described below.

The multipole magnet pair 514 may include a first multipole magnet 520*a* that is coupled to the lid 510 and a second multipole magnet 520*b* that is coupled to the housing 502. The first multipole magnet 520*a* rotates with the lid 510 relative to the housing 502. The second multipole magnet 520*b* is arranged coaxially with the first multipole magnet 520*a* and such that a cogging force resulting from interaction of respective magnetic fields of the first and second multipole magnets 520*a*, 520*b* provides a plurality of discrete stable positions, including the open position (FIGS. 5A & 5B) and the closed position (FIGS. 5C & 5D), between the lid 510 and the housing 502.

The first and second multipole magnets 520*a*, 520*b* may each include an axially polarized multipole disc magnet with four magnetic sections that are arranged in a radial array, such as described above with respect to FIGS. 2A-2C. The first and second multipole magnets 520*a*, 520*b* of the multipole magnet pair 514 may be arranged such that magnetic poles on the first multipole magnet 520*a* align with poles of opposite polarity on the second multipole magnet 520*b* in each of a plurality of stable positions (such as shown in FIG. 2C). The first and second multipole magnets 520*a*, 520*b* may be configured to provide two discrete magnetically stable positions in which the respective magnetic poles of the first and second multipole magnets 520*a*, 520*b* are in stable equilibrium, one being the closed position (FIGS. 5C & 5D) and the other being the open position (FIGS. 5A & 5B) at 180 degrees of rotation of the lid. Additional stable positions may be provided by including more magnetic sections. For the configuration of FIGS. 5A-5D, the first and second multipole magnets 520*a*, 520*b* may be arranged such that the respective magnetic poles on the first and second multipole magnets 520*a*, 520*b* are oriented to repel each other such that the lid 510 is biased towards one of the plurality of discrete stable positions when the lid 510 is positioned between the plurality of discrete stable positions, e.g., when poles of like polarity on the housing 502 and the lid 510 are aligned.

Figure 6:
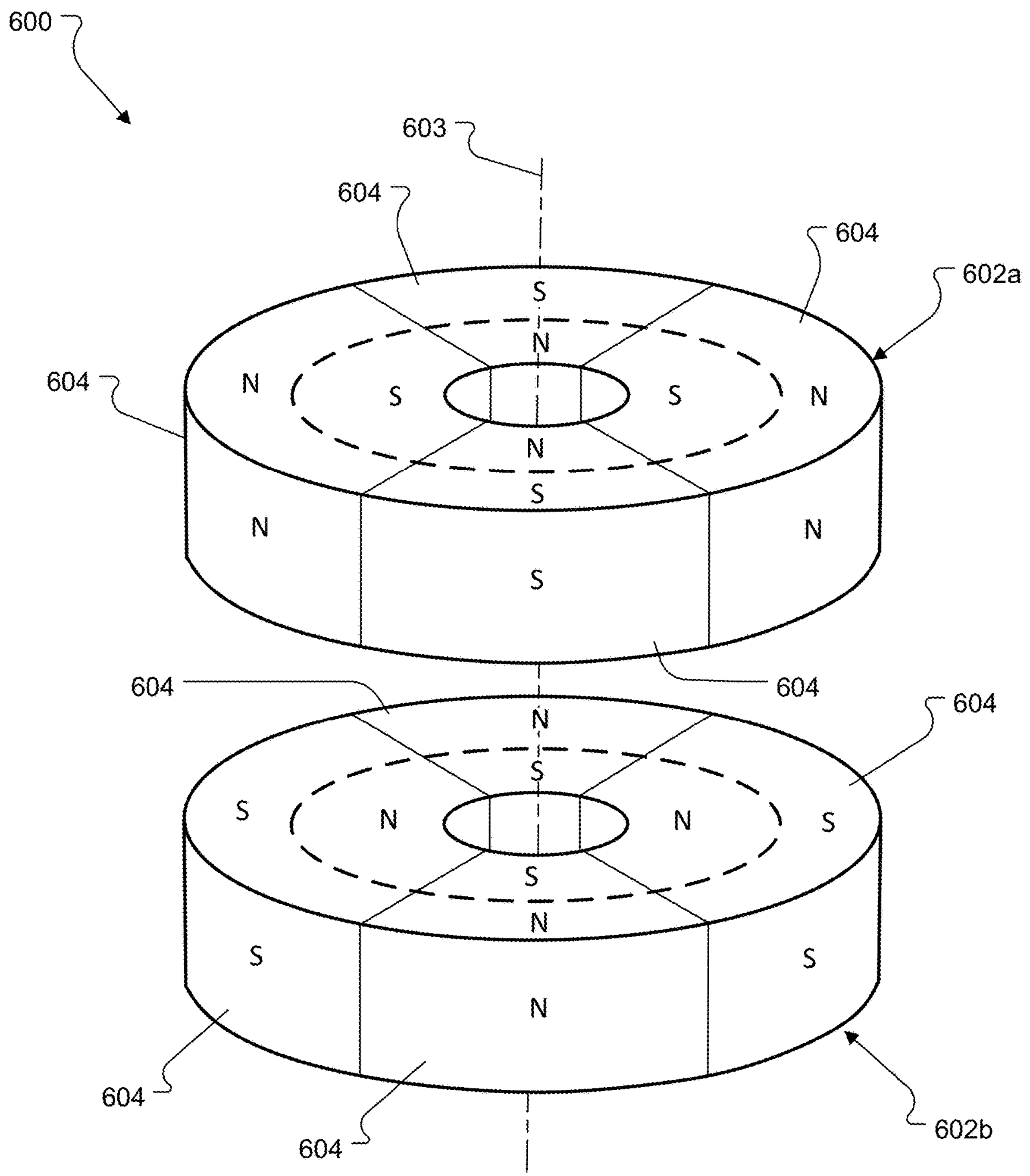
FIG. 6 is a perspective view of another implementation of a pair of multipole magnets.

FIG. 6 illustrates an alternative configuration of a multipole magnet pair 600 that may be used in the implementations of FIGS. 1A-1D and/or FIGS. 5A-5D. With reference to FIG. 6, the multipole magnet pair 600 includes a first multipole magnet 602*a* that may be coupled to a lid (e.g., lid 110 or lid 510) and a second multipole magnet 602*b* that may be coupled to a housing (e.g., housing 102 or housing 510). As in the implementations described above, the first multipole magnet 602*a* rotates (about axis 603) with the lid relative to the housing. The second multipole magnet 602*b* is arranged coaxially with the first multipole magnet 602*a* and such that a cogging force resulting from interaction of respective magnetic fields of the first and second multipole magnets 602*a*, 602*b* provides a plurality of discrete stable positions, including the open position and the closed position, between the lid and the housing.

In the example illustrated in FIG. 6, the first and second multipole magnets 602*a*, 602*b* each include a radially polarized multipole ring magnet with four magnetic sections 604 that are arranged in a radial array. Each magnetic section 604 includes a north magnetic pole (N) arranged along either the inner radial edge or the outer radial edge of the ring and a south magnetic pole (S) arranged along an opposite radial edge (i.e., the other of the inner radial edge or the outer radial edge) of the ring. That is, each magnetic section 604 has a first magnetic pole on the outer radial edge of the ring and a second, opposite, magnetic pole on the inner radial edge of the ring. The magnetic sections 604 alternate in polarity along the radial array such that the north magnetic pole N of each magnetic section 604 is disposed between the south magnetic poles S of the adjacent magnetic sections 604 along the inner and outer radial edges of the rings. The first and second multipole magnets 602*a*, 602*b* of each multipole magnet pair 600 are arranged such that magnetic poles on the first multipole magnet 602*a* align with poles of opposite polarity on the second multipole magnet 602*b* in each of the stable positions. The magnet configuration illustrated in FIG. 6 can provide two discrete stable positions, one being the closed position and the other being the open position at 180 degrees of rotation of the lid. As it the implementations described above, additional stable positions may be provided by including more magnetic sections. The respective magnetic poles on the first and second multipole magnets 602*a*, 602*b* are oriented to repel each other such that the lid is biased towards one of the plurality of discrete stable positions when the lid is positioned between the plurality of discrete stable positions.

Alternatively, the magnet configuration illustrated in FIG. 6 may be configured such that, in the closed position of the lid, the first multipole magnet 602*a* is rotationally offset (e.g., −10 degrees) relative to the second multipole magnet 602*b* such as described above with respect to FIG. 2A. In the open position of the lid, the first multipole pole magnet 602*a* is rotated 100-degrees relative to the closed position, such that respective magnetic poles of opposite polarity on the first and second multipole magnets align in a magnetically stable equilibrium. Such a configuration may be beneficial for clam-shell style cases like the one shown in FIG. 1A.

Figure 7:
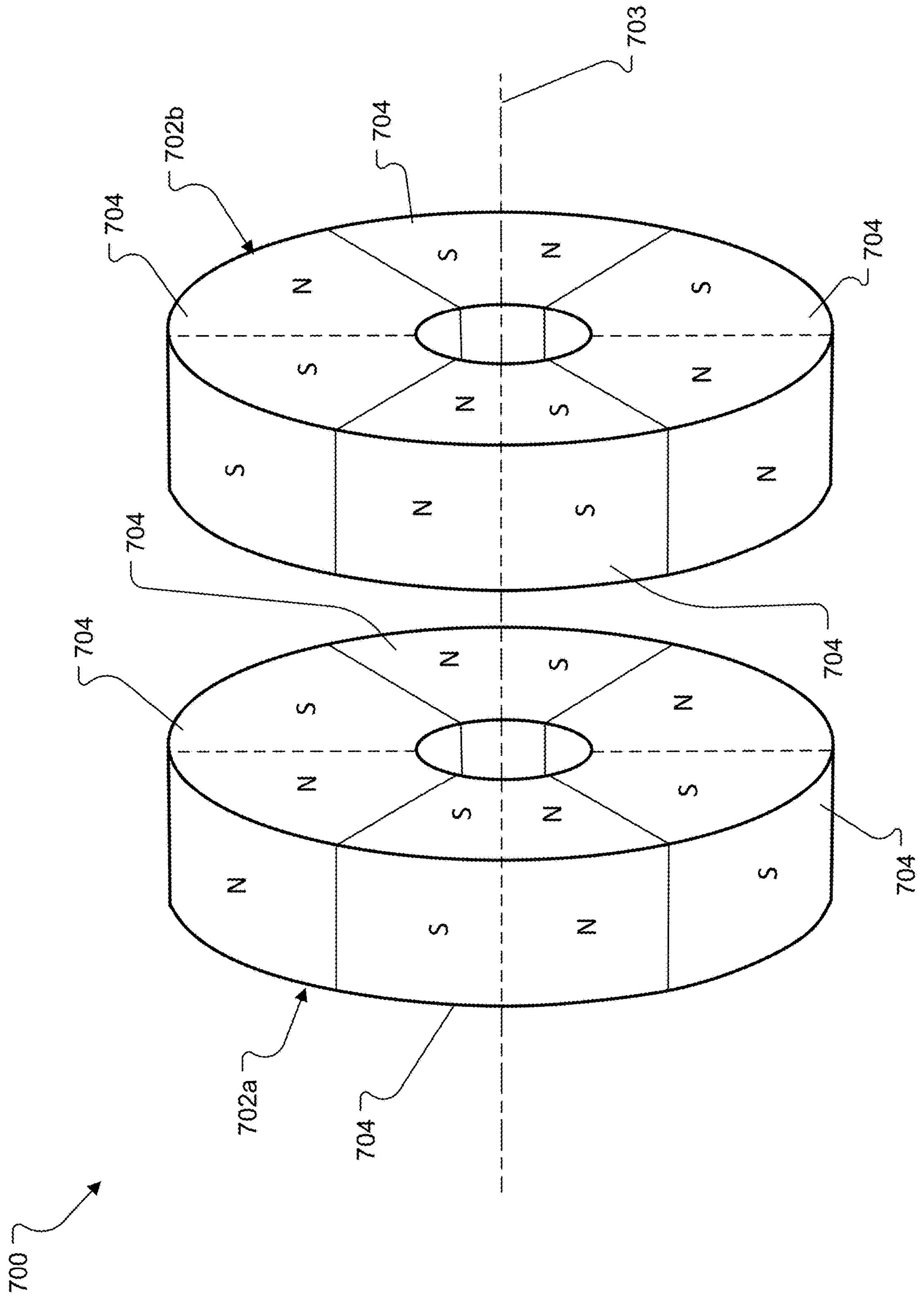
FIG. 7 is a perspective view of yet another implementation of a pair of multipole magnets.

FIG. 7 illustrates an alternative configuration of a multipole magnet pair that may be used in the implementations of FIGS. 1A-1D and/or FIGS. 5A-5D. With reference to FIG. 7, the multipole magnet pair 700 includes a first multipole magnet 702*a* that may be coupled to a lid (e.g., lid 110 or lid 510) and a second multipole magnet 702*b* that may be coupled to a housing (e.g., housing 102 or housing 510). As in the implementations described above, the first multipole magnet 702*a* rotates (about axis 703) with the lid relative to the housing. The second multipole magnet 702*b* is arranged coaxially with the first multipole magnet 702*a* and such that a cogging force resulting from interaction of respective magnetic fields of the first and second multipole magnets 702*a*, 702*b* provides a plurality of discrete stable positions, including the open position and the closed position, between the lid and the housing.

In the example illustrated in FIG. 7, the first and second multipole magnets 702*a*, 702*b* each include a multipole ring magnet with a sectored magnetization. In the illustrated example, each magnet 702*a*, 702*b* includes four magnetic sections 704 that are arranged in a radial array. Each magnetic section 704 includes a north magnetic pole (N) and a south magnetic pole (S). Each pole is in the form of a sector of the ring and each pole is disposed between sectors having opposite polarity such that the sectors alternate in polarity around the ring.

The first and second multipole magnets 702*a*, 702*b* of each multipole magnet pair 700 are arranged such that magnetic poles on the first multipole magnet 702*a* align with poles of opposite polarity on the second multipole magnet 702*b* in each of the stable positions. The magnet configuration illustrated in FIG. 7 provides two discrete stable positions, one being the closed position and the other being the open position at 180 degrees of rotation of the lid. The respective magnetic poles on the first and second multipole magnets 702*a*, 702*b* are oriented to repel each other such that the lid is biased towards one of the plurality of discrete stable positions when the lid is positioned between the plurality of discrete stable positions. As it the implementations described above, additional stable positions may be provided by including more magnetic sections.

Alternatively, the magnet configuration illustrated in FIG. 7 may be configured such that, in the closed position of the lid, the first multipole magnet 702*a* is rotationally offset (e.g., −10 degrees) relative to the second multipole magnet 702*b* such as described above with respect to FIG. 2A. In the open position of the lid, the first multipole pole magnet 702*a* is rotated 100-degrees relative to the closed position, such that respective magnetic poles of opposite polarity on the first and second multipole magnets align in a magnetically stable equilibrium. Such a configuration may be beneficial for clam-shell style cases like the one shown in FIG. 1A.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively.

What is claimed is:

1. A case for a portable electronic device, the case comprising a housing having a cavity to receive the electronic device;

a lid;

a hinge rotatably coupling the lid to the housing such that the lid is operable between an open position in which the cavity is exposed and a closed position in which the lid covers the cavity, the hinge comprising:

a first multipole magnet coupled to the lid such that the first multipole magnet rotates with the lid relative to the housing; and a second multipole magnet coupled to the housing and arranged coaxially with the first multipole magnet and such that the first multipole magnet and the lid rotate relative to the second multipole magnet, wherein due to an interaction between respective magnetic fields of the first and second multipole magnets, the lid is unstable between the open and closed positions, such that, between the open position and the closed position, the lid is biased toward either the open position or the closed position depending on an angle of orientation of the lid relative to the housing, wherein the first and second multipole magnets each comprise a multipole ring magnet with at least four magnetic sections that are arranged in a radial array.

2. The case of claim 1, wherein in the open position respective magnetic poles on the first and second multipole magnets are oriented to attract each other.

3. The case of claim 1, wherein in the open position respective magnetic poles on the first and second multipole magnets are arranged in a magnetically stable orientation relative to each other such that the lid is biased so as to remain in the open position.

4. The case of claim 1, wherein in the closed position respective magnetic poles on the first and second multipole magnets are arranged in a magnetically unstable orientation relative to each other such that the lid is biased into contact with the housing so as to remain in the closed position.

5. The case of claim 1, wherein in the closed position respective magnetic poles on the first and second multipole magnets are oriented to repel each other such that the lid is biased so as to remain in the closed position.

6. The case of claim 1, wherein the cavity is open at an upper surface of the housing, and wherein the lid rotates in a plane of rotation that intersects the upper surface of the housing.

7. The case of claim 1, wherein the cavity is open at an upper surface of the housing, and wherein the lid is configured to rotate in a plane of rotation that is substantially parallel to the upper surface of the housing.

8. The case of claim 1, wherein the first and second multipole magnets are arranged such that a cogging force resulting from interaction of respective magnetic fields of the first and second multipole magnets provides a plurality of discrete stable positions, including the open position and the closed position, between the lid and the housing.

9. The case of claim 8, wherein in the plurality of discrete stable positions respective magnetic poles on the first and second multipole magnets are oriented to attract each other.

10. The case of claim 8, wherein when the lid is positioned between the plurality of discrete stable positions, the respective magnetic poles on the first and second multipole magnets are oriented to repel each other such that the lid is biased towards one of the plurality of discrete stable positions.

11. The case of claim 8, wherein the first and second multipole magnets are arranged such that magnetic poles on the first multipole magnet align with magnetic poles of opposite polarity on the second multipole magnet in each of the stable positions.

12. A case for a portable electronic device, the case comprising a housing having a cavity to receive the electronic device;

a lid;

a hinge rotatably coupling the lid to the housing such that the lid is operable between an open position in which the cavity is exposed and a closed position in which the lid covers the cavity, the hinge comprising:

a first multipole magnet coupled to the lid such that the first multipole magnet rotates with the lid relative to the housing; and a second multipole magnet coupled to the housing and arranged coaxially with the first multipole magnet and such that the first multipole magnet and the lid rotate relative to the second multipole magnet, wherein due to an interaction between respective magnetic fields of the first and second multipole magnets, the lid is unstable between the open and closed positions, such that, between the open position and the closed position, the lid is biased toward either the open position or the closed position depending on an angle of orientation of the lid relative to the housing, wherein the first and second multipole magnets each include an axially polarized multipole ring magnet with at least four magnetic sections that are arranged in a radial array.

13. The case of claim 12, wherein each magnetic section includes a north magnetic pole arranged along one surface of the ring magnet extending between an inner radial edge of the magnet and an outer radial edge of the ring magnet and a south magnetic pole arranged along an opposite surface of the ring magnet extending between an inner radial edge of the ring magnet and an outer radial edge of the ring magnet.

14. The case of claim 13, wherein the magnetic sections of each of the first and second multipole magnets alternate in polarity along the corresponding radial array such that the north magnetic pole of each magnetic section is disposed between the south magnetic poles of the adjacent magnetic sections.

15. The case of claim 12, wherein the first and second multipole magnets are arranged such that magnetic poles on the first multipole magnet align with magnetic poles of opposite polarity on the second multipole magnet when the lid is in the open position.

16. A case for a portable electronic device, the case comprising a housing having a cavity to receive the electronic device;

a lid;

a hinge rotatably coupling the lid to the housing such that the lid is operable between an open position in which the cavity is exposed and a closed position in which the lid covers the cavity, the hinge comprising;

a first multipole magnet coupled to the lid such that the first multipole magnet rotates with the lid relative to the housing; and a second multipole magnet coupled to the housing and arranged coaxially with the first multipole magnet and such that the first multipole magnet and the lid rotate relative to the second multipole magnet, wherein due to an interaction between respective magnetic fields of the first and second multipole magnets, the lid is unstable between the open and closed positions, such that, between the open position and the closed position, the lid is biased toward either the open position or the closed position depending on an angle of orientation of the lid relative to the housing, wherein the first and second multipole magnets each include a radially polarized multipole ring magnet with at least four magnetic sections that are arranged in a radial array.

17. The case of claim 16, wherein each magnetic section includes a north magnetic pole arranged along either an inner radial edge or an outer radial edge of the ring magnet and a south magnetic pole arranged along the other of the inner radial edge or the outer radial edge of the ring magnet.

18. The case of claim 17, wherein each magnetic section has a first magnetic pole on the outer radial edge of the ring magnet and a second, opposite, magnetic pole on the inner radial edge of the ring magnet.

19. The case of claim 17, wherein the magnetic sections of each ring magnet alternate in polarity along the radial array such that a north magnetic pole of each magnetic section is disposed between respective south magnetic poles of adjacent magnetic sections along inner and outer radial edges of the corresponding one of the ring magnets.

20. A case for a portable electronic device, the case comprising a housing having a cavity to receive the electronic device;

a lid;

a hinge rotatably coupling the lid to the housing such that the lid is operable between an open position in which the cavity is exposed and a closed position in which the lid covers the cavity, the hinge comprising:

a first multipole magnet coupled to the lid such that the first multipole magnet rotates with the lid relative to the housing; and a second multipole magnet coupled to the housing and arranged coaxially with the first multipole magnet and such that the first multipole magnet and the lid rotate relative to the second multipole magnet, wherein due to an interaction between respective magnetic fields of the first and second multipole magnets, the lid is unstable between the open and closed positions, such that, between the open position and the closed position, the lid is biased toward either the open position or the closed position depending on an angle of orientation of the lid relative to the housing, wherein the first and second multipole magnets each include a multipole ring magnet with a sectored magnetization, and wherein each multipole ring magnet includes at least four magnetic sections that are arranged in a radial array and each magnetic section includes a north magnetic pole and a south magnetic pole, and wherein each magnetic pole is in the form of a sector of the ring magnet and each magnetic pole is disposed between sectors having opposite polarity such that the sectors alternate in polarity around the ring magnet.

21. The case of claim 20, wherein the first and second multipole magnets are arranged such that magnetic poles on the first multipole magnet align with magnetic poles of opposite polarity on the second multipole magnet in each of the stable positions.

* * * * *